United States Patent
Jang

(10) Patent No.: US 11,585,039 B2
(45) Date of Patent: Feb. 21, 2023

(54) METHOD FOR PREVENTING ACCIDENT PERFORMED BY HOME APPLIANCE AND CLOUD SERVER USING ARTIFICIAL INTELLIGENCE

(71) Applicant: LG ELECTRONICS INC., Seoul (KR)

(72) Inventor: Yongwoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 838 days.

(21) Appl. No.: 16/533,379

(22) Filed: Aug. 6, 2019

(65) Prior Publication Data
US 2020/0048817 A1 Feb. 13, 2020

(30) Foreign Application Priority Data
Aug. 7, 2018 (KR) .......................... 10-2018-0091973

(51) Int. Cl.
| | |
|---|---|
| G10L 15/30 | (2013.01) |
| D06F 39/14 | (2006.01) |
| G10L 15/18 | (2013.01) |
| G10L 15/22 | (2006.01) |
| G07C 9/00 | (2020.01) |
| G06F 17/18 | (2006.01) |

(Continued)

(52) U.S. Cl.
CPC .............. *D06F 39/14* (2013.01); *G06F 17/18* (2013.01); *G06F 40/00* (2020.01); *G06N 3/0418* (2013.01); *G07C 9/00174* (2013.01); *G10L 15/1807* (2013.01); *G10L 15/22* (2013.01); *G07C 2009/00769* (2013.01); *G10L 2015/223* (2013.01)

(58) Field of Classification Search
CPC ... G10L 15/22; G10L 17/00; G10L 2015/223; D06F 2105/44; D06F 37/42; D06F 2105/60; D06F 34/14; D06F 2105/58
See application file for complete search history.

(56) References Cited

U.S. PATENT DOCUMENTS

| | | | | |
|---|---|---|---|---|
| 8,661,859 | B2 * | 3/2014 | Choi .................. | D06F 37/42 68/12.26 |
| 2010/0270962 | A1 * | 10/2010 | Yoon .................. | D06F 33/47 318/446 |

(Continued)

FOREIGN PATENT DOCUMENTS

WO WO-2015022070 A1 * 2/2015 ............. D06F 33/48

*Primary Examiner* — Olujimi A Adesanya
(74) *Attorney, Agent, or Firm* — Lee, Hong, Degerman, Kang & Waimey PC

(57) ABSTRACT

Provided is a method for preventing an accident related to children or pets that may occur by a home appliance using artificial intelligence. According to the present disclosure, the method for preventing the accident comprises comparing a distance between the home appliance and a generation position of the voice signal and a reference distance when the generation position of the voice signal is outside of the home appliance. Then, the present disclosure enables switching a door of the home appliance to a lock state when a distance between the home appliance and the generation position of the voice signal is less than the reference distance. Thus, the present disclosure may enable controlling the home appliance to prevent children or pets from entering an inside of the home appliance.

17 Claims, 8 Drawing Sheets

(51) Int. Cl.
*G06N 3/04* (2023.01)
*G06F 40/00* (2020.01)

(56) References Cited

U.S. PATENT DOCUMENTS

| | | | |
|---|---|---|---|
| 2011/0218650 A1* | 9/2011 | Crucs | G05B 11/01 |
| | | | 700/13 |
| 2012/0235514 A1* | 9/2012 | Astrauskas | D06F 33/47 |
| | | | 307/326 |
| 2015/0032456 A1* | 1/2015 | Wait | G10L 15/22 |
| | | | 704/275 |
| 2015/0035432 A1* | 2/2015 | Kendall | F25D 27/005 |
| | | | 315/76 |
| 2015/0095026 A1* | 4/2015 | Bisani | H04R 3/005 |
| | | | 704/232 |
| 2015/0192915 A1* | 7/2015 | Seo | G05B 15/02 |
| | | | 700/275 |
| 2015/0330008 A1* | 11/2015 | Yang | D06F 34/32 |
| | | | 700/275 |
| 2017/0004828 A1* | 1/2017 | Lee | G06F 3/012 |
| 2017/0069150 A1* | 3/2017 | Kim | G07C 9/00309 |
| 2017/0105190 A1* | 4/2017 | Logan | H04W 68/00 |
| 2017/0268924 A1* | 9/2017 | Shin | G01V 8/10 |
| 2018/0046864 A1* | 2/2018 | Flint | H04N 5/23206 |
| 2018/0266034 A1* | 9/2018 | Kamiyama | D06F 29/005 |
| 2020/0087846 A1* | 3/2020 | Park | G08B 21/22 |
| 2021/0409896 A1* | 12/2021 | Ahn | H04W 88/06 |

* cited by examiner

METHOD FOR PREVENTING ACCIDENT PERFORMED BY HOME APPLIANCE AND CLOUD SERVER USING ARTIFICIAL INTELLIGENCE

CROSS-REFERENCE TO RELATED APPLICATION

Pursuant to 35 U.S.C. § 119(a), this application claims the benefit of earlier filing date and right of priority to Korean Patent Application No. 10-2018-0091973, filed on Aug. 7, 2018, the contents of which are hereby incorporated by reference herein in its entirety.

BACKGROUND

1. Field of the Invention

A method for preventing an accident related to children or pets that may occur by a home appliance is disclosed herein.

2. Description of Related Art

Home appliances used in a predetermined space such as home or offices, and the like may perform their own functions and operations. Examples of a home appliance may include a washing machine, a dryer, an air conditioner, a robot cleaner, an air purifier, a refrigerator, an oven range, a water purifier, and the like.

Among them, the washing machine may include a drum or a tub that washes laundry, and a motor that rotates the drum or the tub. Likewise, the dryer may include a drum or a tub that dries the laundry and a motor that rotates the drum or the tub.

The drum or the tub provided in such a washing machine or a dryer may have a large inner space to accommodate a large amount of laundry. As a result, when children or pets enter the drum or the tub of the washing machine or the dryer and are locked inside of the drum or the tub of the washing machine or the dryer, there may be a problem that safety accidents may occur.

In order to prevent such a safety accident, recently, the washing machine or the dryer has a safety device that senses a movement of an object in a drum or a tub thereof and notify people outside of the washing machine or the dryer of information on the movement of an object in the drum or the tub of the washing machine and the dryer.

However, the movement of the object may be sensed only when the product is operated for a predetermined time or at a predetermined RPM or more in the related art. Thus, in the related art, there has been a problem that the children or the pets that are locked in the drum or the tub may be found after the children or the pets are exposed to a dangerous situation.

SUMMARY OF THE INVENTION

The present disclosure provides a method for preventing an accident that enables controlling a home appliance such that children or pets may not enter an inside of the home appliance.

The present disclosure further provides a method for preventing an accident that enables controlling a home appliance such that the home appliance may not operate when the children or the pets approach the home appliance.

The present disclosure also provides a method for preventing an accident, comprising immediately stopping operation of a home appliance and opening a door of the home appliance when sound of children or pets is sensed inside of the home appliance during operation of the home appliance.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and the advantages of the present disclosure may be implemented by means appended in claims and a combination thereof.

According to the present disclosure, a method for preventing an accident comprises comparing a distance between a home appliance and a generation position of a voice signal and a reference distance when the generation position of the voice signal is outside of the home appliance. Then, the present disclosure enables switching a door of the home appliance to a lock state when the distance between the home appliance and the generation position of the voice signal is less than the reference distance. Thus, the present disclosure may enable controlling the home appliance to prevent the children or the pets from entering the inside of the home appliance.

In addition, according to the present disclosure, the method for preventing an accident comprises comparing the distance between the home appliance and the generation position of the voice signal and the reference distance when the generation position of the voice signal is outside of the home appliance. Then, according to the present disclosure, when the distance between the home appliance and the generation position of the voice signal is less than the reference distance, the home appliance switches an operation button to a lock state. Accordingly, the present disclosure may enable controlling the home appliance not to operate when the children or the pets are adjacent to the home appliance.

In addition, according to the present disclosure, the method for preventing an accident comprises stopping an operation of the home appliance when the generation position of the voice signal is inside of the home appliance and the home appliance is in operation. Then, according to the present disclosure, the door of the home appliance is switched to an open state. Accordingly, the present disclosure may enable controlling the home appliance to prevent the home appliance from operating when the children or the pets enter the inside of the home appliance.

According to the present disclosure, the method for preventing the accident comprises switching the door to the lock state when the children or the pets approach the home appliance. Therefore, the present disclosure may enable fundamentally preventing the children or the pets from entering the inside of the home appliance, thereby improving reliability of the home appliance with respect to safety.

In addition, according to the present disclosure, the method for preventing the accident comprises switching, by the home appliance, the operation button to a lock state when the children or the pets are located near the home appliance. Therefore, the present disclosure may enable fundamentally preventing the safety accidents from occurring due to the operation of the home appliance. That is, the present disclosure may enable minimizing a possibility of occurrence of the safety accidents by providing a double safety device.

In addition, according to the present disclosure, the method for preventing the accident comprises stopping the operation of the home appliance when sound of children or pets is sensed inside of the home appliance. Therefore, the present disclosure may enable preventing the safety accidents that may occur when the children or the pets enter the inside of the home appliance. In addition, risk of occurrence of the accidents may be further reduced by determining a dangerous situation through machine learning based on the sensed sound, thereby improving the reliability of the user with respect to a product and improving a brand value of the product.

The effects of the present disclosure are not limited to the effects described above, and those skilled in the art of the present disclosure may readily understand various effects obtained by the present disclosure based on the specific description of the disclosure.

DETAILED DESCRIPTION OF EXEMPLARY EMBODIMENTS

Figure 1:
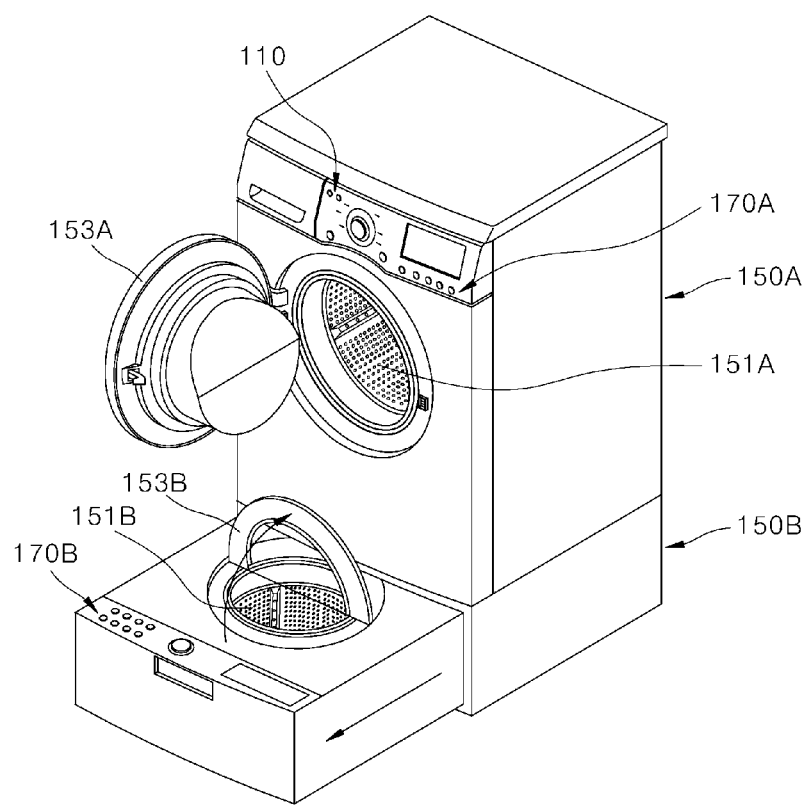
FIG. 1 is a perspective view of a home appliance according to an implementation of the present disclosure.

The advantages and features and a method for achieving them of the present disclosure will become apparent with reference to the implementations described below in detail with reference to the accompanying drawings. The present disclosure may, however, be implemented in many different manners and should not be construed as being limited to the implementations set forth herein. Rather, these implementations are provided so that this disclosure will be thorough and complete, and will fully convey the scope of the disclosure to those skilled in the art to which the present disclosure pertains, and the disclosure is only defined by the scope of claims. Like reference numerals indicate like elements throughout the disclosure.

Unless defined otherwise, all terms (including technical and scientific terms) used herein may be used in a sense commonly understood by one of ordinary skill in the art to which the present disclosure pertains. Further, commonly used terms, which are defined in a dictionary, are not ideally or excessively interpreted unless explicitly and particularly defined otherwise.

Further, with respect to the implementation of the present disclosure, for convenience of explanation, the present disclosure may be described by subdividing components; however, these components may be implemented within one apparatus or module, or a component may be implemented by being divided into a plurality of apparatuses or modules.

Hereinafter, a method for preventing an accident performed by a home appliance and a cloud server according to an implementation of the present disclosure will be described with reference to FIGS. 1 to 8.

FIG. 1 is a perspective view of a home appliance according to an implementation of the present disclosure. Examples of the home appliances may include washing machines, dryers, air conditioners, robot cleaners, air purifiers, refrigerators, oven ranges, water purifiers, and the like. For convenience of explanation, FIG. 1 shows an example of a washing machine.

However, the present disclosure is not limited thereto, and the method for preventing the accident according to some implementations of the present disclosure may be applied to various types of home appliances that have an inner space in which children or pets may be locked therein.

Referring to FIG. 1, a home appliance 100 (i.e., a washing machine) includes a plurality of washing units. Specifically, the home appliance 100 may include a first washing unit 150A and a second washing unit 150B.

The first washing unit 150A and the second washing unit 150B may be arranged adjacent to each other. For example, the first washing unit 150A and the second washing unit 150B may be arranged vertically.

At this time, the first washing unit 150A may be coupled to or may be separated from the second washing unit 150B. The first washing unit 150A and the second washing unit 150B may have respective housings. The respective housings may be coupled to and separated from each other.

In addition, the first washing unit 150A and the second washing unit 150B may be arranged in housing. In this case, the first washing unit 150A and the second washing unit 150B may be fixed into the housing and may not be separated from the housing.

A front load-type first washing unit 150A and a top load-type second washing unit 150B may be provided.

The front load-type washing unit has a form in which laundry is inserted into an inside of the tub from a front surface thereof. Therefore, in the front load-type washing unit, the tub in which the laundry is processed rotates about a substantially horizontal axis.

On the other hand, the top load-type washing unit has a form in which the laundry is inserted into the inside of the tub. Therefore, in the top load-type washing unit, the tub in which the laundry is processed rotates about a substantially vertical axis.

FIG. 1 shows a front load-type first washing unit 150A and a top load-type second washing unit 150B. However, the present disclosure is not limited thereto, and the first washing unit 150A and the second washing unit 150B may be modified in various manners and implemented.

The first washing unit 150A may include a first tub 151A, a first door 153A, and a first interface 170A. The first door 153A is installed at an inlet of the first tub 151A. The first interface 170A includes various types of buttons to control the operation of the first washing unit 150A.

Similarly, the second washing unit 150B may include a second tub 151B, a second door 153B, and a second interface 170B. The second door 153B is installed at an inlet of the second tub 151B. The second interface 170B includes various types of buttons to control the operation of the second washing unit 150B.

That is, the first washing unit 150A and the second washing unit 150B may include separate tubs 151A and 151B, doors 153A and 153B, and interfaces 170A and 170B, respectively. Accordingly, the first washing unit 150A and the second washing unit 150B may operate independently of each other.

On the other hand, as children or pets have a small-sized body, the children or the pets may easily enter the first tub 151A or the second tub 151B of the washing machine. When the home appliance 100 is operated when the children or the pets enter the tubs 151A and 151B of the washing machine, the children or the pets may get seriously injured.

Accordingly, according to the present disclosure, the home appliance 100 may perform the method for preventing the accidents that may occur when the children or the pets enter the inside of the home appliance.

Hereinafter, specific components of the home appliance 100 to perform the method for preventing an accident will be described.

Figure 2:
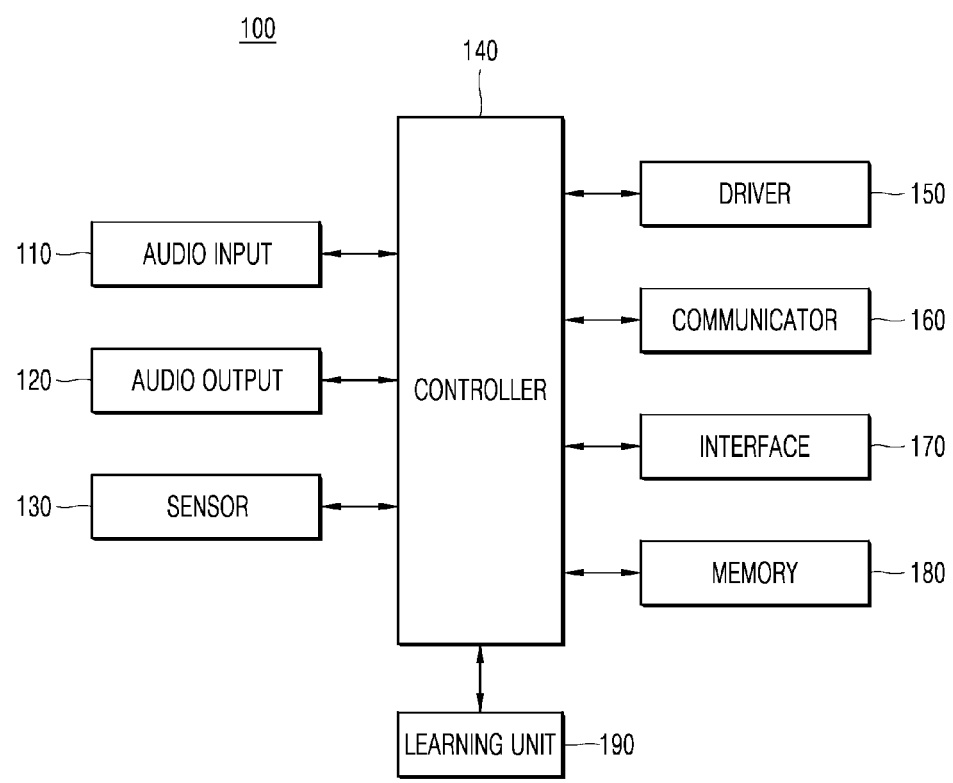
FIG. 2 is a block diagram of the home appliance of FIG. 1.

FIG. 2 is a block diagram of the home appliance of FIG. 1.

Referring to FIG. 2, according to an implementation of the present disclosure, a home appliance 100 includes an audio input 110, an audio output 120, a sensor 130, a controller 140, a driver 150, a communicator 160, an interface 170, a memory 180, and a learning unit 190. According to FIG. 2, the audio input 110, the audio output 120, the sensor 130, the controller 140, the driver 150, the communicator 160, the interface 170, the memory 180, and the learning 190 may be implemented as a processor. Alternatively, some components thereof may be implemented as a processor. Further, the processor may provide processing and memory functions.

The audio input 110 may receive voice signals outside or inside of the home appliance 100. To this end, the audio input 110 may include one or more microphones (MIC).

For reference, the audio input 110 may include a plurality of MICs to calculate a position at which a voice signal is generated.

For example, the audio input 110 may have a plurality of external sensing MICs that sense sound outside of the home appliance 100 and an internal sensing MIC that senses sound inside of the home appliances 100.

At this time, the plurality of external sensing MICs may be spaced apart from one another. The controller 140 described below may calculate the generation position of a voice signal based on each of the signals related to the voice sensed by the plurality of external sensing MICs that are spaced apart from one another.

Meanwhile, the internal sensing MIC may be arranged inside of the home appliance 100. The controller 140 described below may determine whether there are children or pets inside of the home appliance 100 using the voice signal received at the internal sensing MIC.

However, the present disclosure is not limited thereto, and the above-mentioned external sensing MIC and the internal sensing MIC the audio input 110 includes may be integrated into a MIC module and implemented.

Further, the audio input 110 may remove noise by comparing data received at the plurality of MICs. The audio input 110 may use various types of noise removal algorithms to remove noise generated during a process of receiving a voice command of the user. Further, the audio input 110 may include components to process an audio signal, such as a filter that removes noise from the audio signal received at each MIC and an amplifier that amplifies the signal output from the filter and output the amplified signal. Accordingly, the audio input 110 may correctly receive the voice command of the user.

The audio output 120 may convert voice data into sound and output the converted sound. The audio output 120 may include a component (e.g., a speaker, and the like) that converts electrical signals into sound. The audio output 120 may receive audio data from the controller 140.

When the children or the pets approach the home appliance 100, the audio output 120 may generate warning sound. In addition, when the children or the pets are disposed inside of the home appliance 100, the audio output 120 may generate the warning sound.

The sensor 130 may include one or more sensors capable of sensing the movement of the user. In addition, the sensor 130 may sense a presence of the user or a distance between a user and the home appliance 100. The sensor 130 may include a PIR sensor, an image sensor, a thermal image sensor, an infrared sensor, and the like. However, the present disclosure is not limited thereto.

In addition, the sensor 130 may sense whether the children or the pets are present in the home appliance 100. The sensed information may be provided to the controller 140 and used.

The controller 140 may perform overall control of the components the home appliance 100 includes.

The controller 140 receives a voice signal from the audio input 110. Then, the controller 140 may analyze the received voice signal to calculate the generation position of the voice signal. Accordingly, the controller 140 may determine whether the generation position of the voice signal is inside or outside of the home appliance 100.

The controller 140 calculates the distance between the home appliance 100 and a user (e.g., children or pets) that generates the voice signal when the generation position of the voice signal is outside of the home appliance 100.

For reference, the controller 140 may calculate the distance between the user and the home appliance 100 using the signal sensed by the sensor 130.

Then, the controller 140 may compare the generation position of the voice signal with a predetermined reference distance. At this time, the reference distance may be a preset distance (for example, 1 meter from the home appliance 100) to prevent the safety accidents. For reference, the reference distance may vary and implemented.

If the distance between the home appliance and the generation position of the voice signal is less than the predetermined reference distance, the controller 140 may switch the first door 153A of the first washing unit 150A and the second door 153B of the second washing unit 150B to the lock state. Further, the controller 140 may switch the first interface 170A of the first washing unit 150A and the second interface 170B of the second washing unit 150B to the lock state. That is, the controller 140 may switch the operation button of the home appliance 100 into the lock state.

If the distance between the home appliance and the generation position of the voice signal is less than a predetermined reference distance, the controller 140 may enable the audio output 120 to generate the warning sound. As a result, the home appliance 100 may prevent the children or the pets from approaching the tub.

Further, the controller 140 may enable the communicator 160 to transmit a notification message to a user terminal 300 when the generation position of the voice signal is less than a predetermined reference distance. At this time, the notification message may include information on 'children or pets approached a vicinity of the home appliance 100'.

Meanwhile, when the generation position of the voice signal is inside of the home appliance 100, the controller 140 may enable the audio output 120 to generate the warning sound. Through the warning sound, the home appliance 100 may inform the surrounding people that a safety accident may occur. In addition, through the warning sound, the home appliance 100 may prevent the children or the pets from entering the inside of the washing machine.

On the other hand, when the voice signal is sensed inside of the home appliance 100 during the operation of the home appliance 100, the controller 140 may stop the operation of the driver 150 immediately. The controller 140 may switch the first door 153A of the first washing unit 150A and the second door 153B of the second washing unit 150B to the open state.

The controller 140 may switch the first interface 170A of the first washing unit 150A and the second interface 170B of the second washing unit 150B to the lock state. That is, the controller 140 may switch the operation button of the home appliance 100 into the lock state.

The controller 140 may enable the communicator 160 transmitting a notification message to a user terminal 300 when the voice signal is sensed inside of the home appliance 100 during the operation of the home appliance 100. At this time, the notification message may include information on 'children or pets are found inside of the home appliance 100'.

When the voice signal is sensed inside of the home appliance 100 during the operation of the home appliance 100, the controller 140 may enable the audio output 120 to generate the warning sound. Thus, the home appliance 100 may notify the surrounding people that the safety accident has occurred.

In addition, the operation of the controller 140 described above may be performed only when it is determined that the current state is a dangerous state. The current state may be determined using output information of the learning unit 190 based on the machine learning. A detailed description thereof will be described below with reference to FIG. 5.

The driver 150 may include the above-mentioned first washing unit 150A and second washing unit 150B. As described above, the first washing unit 150A and the second washing unit 150B may operate with separate washing courses, respectively. The operation of the driver 150 may be controlled by the controller 140.

The communicator 160 includes one or more communication modules. Accordingly, the communicator 160 may perform wireless communication with other electronic devices and exchange various types of signals. For example, the communicator 160 may exchange data with separate servers or user terminals using a wireless Internet network.

The interface 170 may include a plurality of operation buttons and a display. The user may set a washing course or an additional washing option using a plurality of operation buttons. The display may display information on a command input by a user, a processing result in response to a command input by the user, an operation course, an operation state, an error state, and the like, of the washing machine. In addition, the interface 170 may have a touch pad and a touch screen, which are coupled to each other.

The memory 180 records various kinds of information necessary for the operation of the washing machine, and may include a volatile or nonvolatile recording medium. Data to analyze a voice signal and data to determine a situation may be stored in a database form in the memory 180.

The learning unit 190 may perform the machine learning based on the received voice data. The memory 180 may store data used for the machine learning, result data, and the like.

In more detail, technology of deep learning, which is a kind of machine learning, denotes learning with a deep level, in multi steps, based on the data.

The deep learning may represent a set of machine learning algorithms that may be used to extract key data from a large amount of data as it goes higher step.

A structure of the deep learning may include an artificial neural network (ANN). For example, the structure of the deep learning may include a deep neural network (DNN) such as a convolutional neural network (CNN), a recurrent neural network (RNN), and deep belief network (DBN).

The learning unit 140 may use various types of known structures of deep learning. For example, the learning unit 190 may use a structure such as the convolutional neural network (CNN), the recurrent neural network (RNN), and the deep belief network (DBN).

Specifically, the convolutional neural network (CNN) is a model that simulates a function of brain of a person made based on an assumption that basic features of an object is extracted, when the person recognizes the object, and complex calculation is performed in the brain and the object is recognized based on the result thereof.

Recurrent neural network (RNN) is widely used for natural language processing, and the like, and may have a structure that is effective for processing time-series data that is changed over time and may have a structure of the ANN by stacking layers every time.

The deep belief network (DBN) has a structure of deep learning that is made by stacking restricted boltzman machine (RBM) which is a deep learning technique. When the learning of the restricted boltzman machine (RBM) is repeated and the predetermined number of layers is formed, the deep belief network (DBN) that has the corresponding number of layers may be provided.

Meanwhile, the learning based on the ANN of the learning unit 190 may be performed by adjusting the weight of an inter-node connection line (adjusting a bias value as necessary) so that a desired output is obtained for a given input.

Further, the ANN may enable continuously updating a weight value by learning. Back propagation, and the like may be used to perform the learning based on the ANN.

Meanwhile, the memory 190 may have an artificial neural network previously learned by machine learning.

That is, according to an implementation of the present disclosure, the home appliance 100 may perform determining the situation based on the machine learning with the received voice signal as the input data. At this time, both unsupervised learning and supervised learning may be used as a method of machine learning based on the ANN. In addition, the learning unit 190 may update the structure of the ANN through the voice recognition, after learning, according to the setting.

At this time, the controller 140 generates a parameter for the received voice signal and provides the learning unit 190 with the information on the parameter. The learning unit 190 may input the received parameter as a learning factor and output state information indicating the state of the speaker who has uttered the voice signal as an output thereof.

Then, the state information output from the learning unit 190 is transmitted to the controller 140. The controller 140 determines whether the current state of the speaker is a steady state or a dangerous state based on the received state information. Then, the controller 140 may perform the above-described method for preventing the accident when the current state is the dangerous state.

A detailed method of the machine learning performed by the learning unit 190 will be described below with reference to FIG. 5.

Additionally, according to another implementation of the present disclosure, the operation of the learning unit 190 may be performed by a separate cloud server 200. According to an implementation of the present disclosure, a system in which an operation of machine learning is performed inside thereof such as the home appliance 100 is referred to as 'an internal learning-based system'. On the other hand, a system in which the operation of the machine learning is performed outside thereof is referred to as 'an external learning-based system'.

Hereinafter, the home appliance 101 and the cloud server 200 that constitute the external learning-based system will be described with reference to FIGS. 3 and 4.

Figure 3:
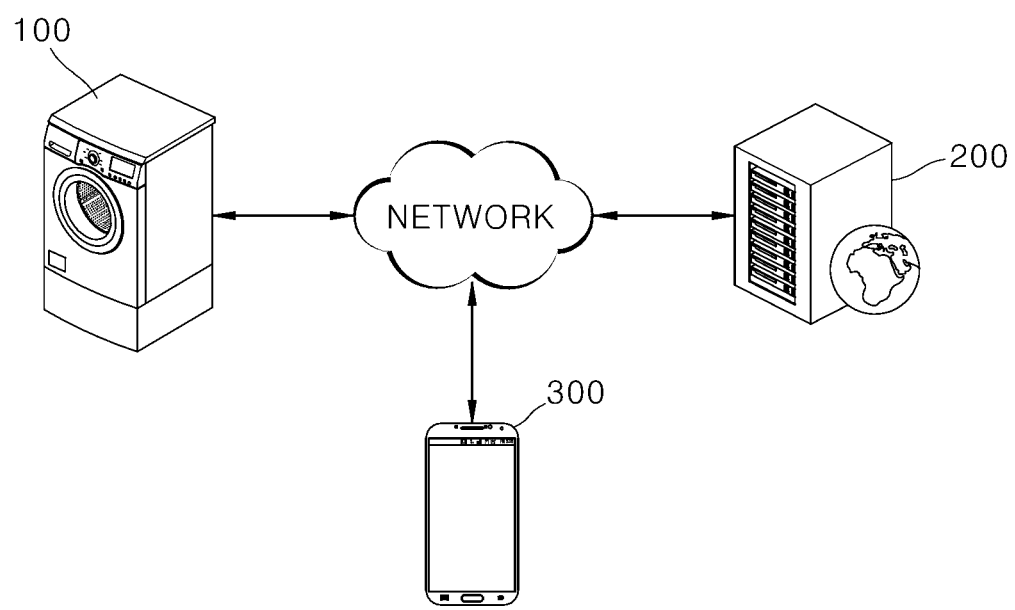
FIG. 3 shows a cloud server that communicates with a home appliance according to another implementation of the present disclosure.

FIG. 3 shows a cloud server that communicates with a home appliance according to another implementation of the present disclosure. FIG. 4 is a block diagram of relations between a home appliance and a cloud server according to another implementation of the present disclosure.

Figure 4:
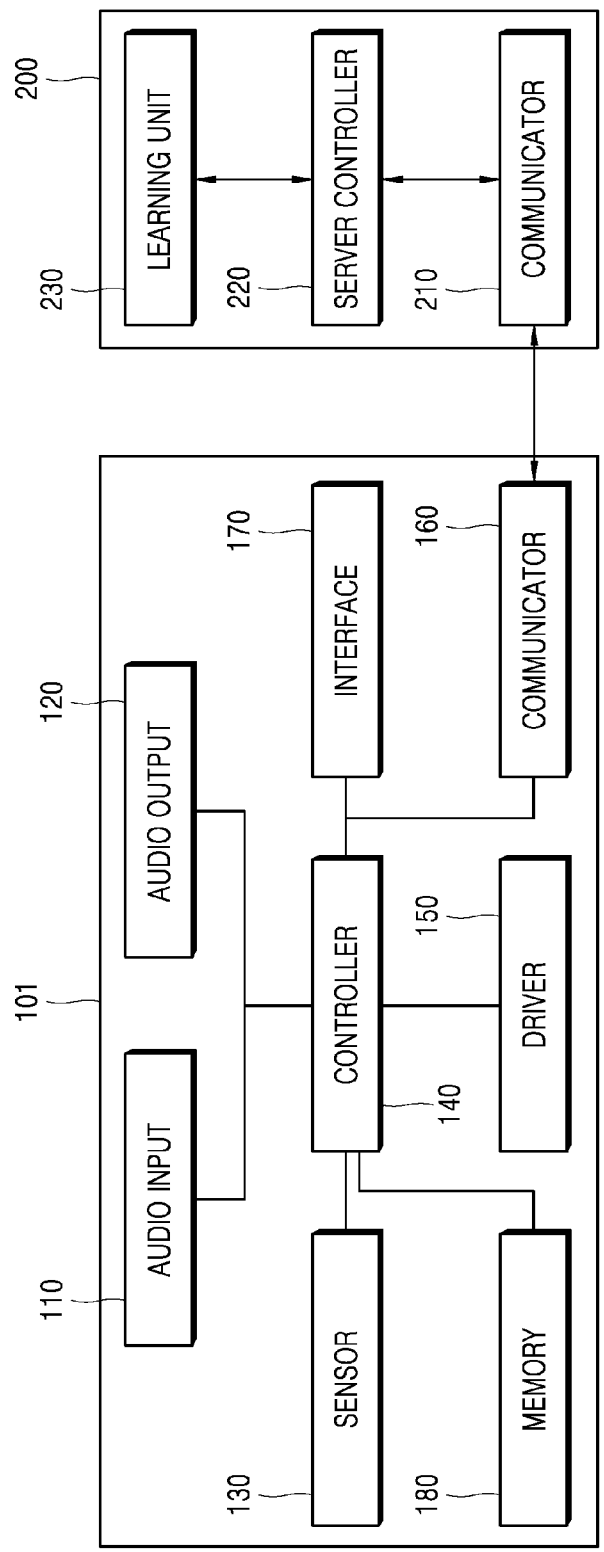
FIG. 4 is a block diagram of relations between a home appliance and a cloud server according to another implementation of the present disclosure.

Referring to FIGS. 3 and 4, an audio input 110, an audio output 120, a sensor 130, a controller 140, a driver 150, a communicator 160, an interface 170, and a memory 180 among components of the home appliance 101 that have the external learning-based system may operate substantially the same as the components of the home appliance 100 described above with reference to FIG. 2. The repetitive description of the components of the home appliance 101 is omitted.

The controller 140 may extract the parameters necessary for determining the state information indicating the state of the speaker. At this time, the controller 140 analyzes the received voice signal to generate the parameter.

The parameter may include at least one of a ratio of high-pitched tone of a voice signal, average magnitude of the voice signal, and pattern information of the voice signal. However, this is merely an example, and the parameters may be variously modified and implemented.

In addition, the above-mentioned parameters may include factors that may distinguish a variety of sounds, such as voice of children, playful sound of children, sound of pets, sound of screaming of children in emergency situations, and sound of pets in excited conditions.

Then, the controller 140 enables the communicator 160 to transmit information on the extracted parameters to the cloud server 200.

The cloud server 200 includes a communicator 210, a server controller 220, and a learning unit 230. The cloud server 200 of FIG. 4 may be implemented as a processor. Alternatively, some components of the communicator 210, the server controller 220, and the learning unit 230 of the cloud server 200 may be implemented as a processor. A processor may also provide processing and memory functions.

The communicator 210 is wirelessly connected to the communicator 160 of the home appliance 100 to exchange data with the communicator 160.

The server controller 220 transmits information on the parameters received from the communicator 210 to the learning unit 230.

The learning unit 230 receives the information on the parameter as a learning factor (i.e., an input factor). Then, the learning unit 190 may output the state information indicating the state of the speaker who has uttered the voice signal as an output factor.

The learning unit 230 may generate links between one or more hidden layers and each input/output factor, and a bias or weight of each link in a learning process, and may store information updated from the outside. In this case, the learning unit 230 may be stored in the cloud server 200 in different versions.

The cloud server 200 may receive information on a learning factor (i.e., a parameter) from a plurality of control modules and generate an output factor corresponding thereto. In addition, the learning factors provided by the plurality of control modules may be continuously input to the learning unit 230 to update the learning unit 230. The learning unit 230 may estimate level of load using a predetermined learning algorithm.

The state information output by the learning unit 230 may include steady-state information and dangerous state information. At this time, each steady-state information and dangerous state information may be expressed by probability.

If the probability of the dangerous state information is greater than the probability of the probability of the steady-state information, the server controller 220 may determine that the current state of the speaker is in the dangerous state. On the other hand, when the probability of dangerous state information is less than the probability of the steady-state information, the server controller 220 may determine that the current state of the speaker is in the steady state.

In addition, determination with respect to the current state of the speaker performed by the above-mentioned server controller 220 may be performed by the controller 140 of the home appliance 101.

Hereinafter, the configuration of the learning units 190 and 230 according to some implementations of the present disclosure will be described.

Figure 5:
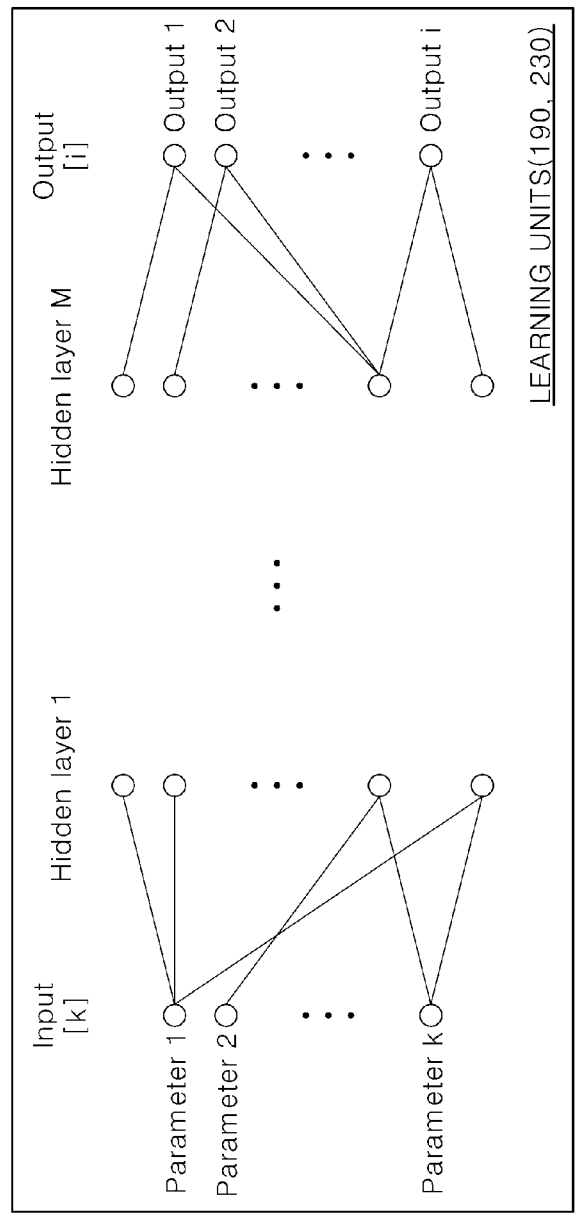
FIG. 5 shows a configuration of a learning unit according to some implementations of the present disclosure.

FIG. 5 shows a configuration of a learning unit according to some implementations of the present disclosure.

Referring to FIG. 5, the learning units 190 and 230 include an input layer that has N-number of parameters as input nodes, an output layer (output) that has state information as output nodes, and one or more of hidden layers between the input layer and the output layer.

A weight of the edge that connects the nodes of the layers may be set. The weight thereof or edge may be added, removed, or updated during the learning process. Thus, through the learning process, the weights of the edges and the nodes arranged between k-number of input nodes and i-number of output nodes may be updated.

As shown in FIG. 5, i-number of output nodes may be arranged so as to output values such as 1/0 or probability in each mode. For example, as described above, the output node may have steady-state information and dangerous state information (i.e., two kinds of information). At this time, each steady-state information and dangerous state information may be expressed by probability.

All nodes and edges may be set to initial values before the learning units 190 and 230 perform the learning. However, when the information is accumulatively input, the weights of the nodes and the edges are changed, and matching of parameters input as learning factors with state information output to the output nodes may be made during the process.

In addition, when the cloud server 200 is used, the learning unit 230 may receive information on a large number of parameters and process the parameters. Therefore, the learning unit 230 may perform the learning based on a large amount of data.

In summary, the weights of nodes and edges between the input node and the output node the learning units 190 and 230 include of FIG. 5 may be updated by the learning process of the learning units 190 and 230. The state information output by the learning units 190 and 230 may be used to determine the state information of the speaker.

The state information output by the learning units 190 and 230 may include the steady-state information and the dangerous state information. At this time, each of steady-state information and dangerous state information may be expressed by probability.

If the probability of dangerous state information is greater than the probability of the steady-state information, the current state of the speaker may be determined as the dangerous state. On the other hand, if the probability of dangerous state information is less than the probability of the steady-state information, the current state of the speaker may be determined as the steady state.

If the current state of the speaker is determined to be in the dangerous state, according to the present disclosure, the method for preventing the accidents may be performed by the controller 140 of the home appliances 100 and 101. Hereinafter, a method for preventing the accidents according to some implementations of the present disclosure will be described in detail.

Hereinafter, for convenience of explanation, according to an implementation of the present disclosure, the home appliance 100 that operates through an internal learning-based system, will be described.

Figure 6:
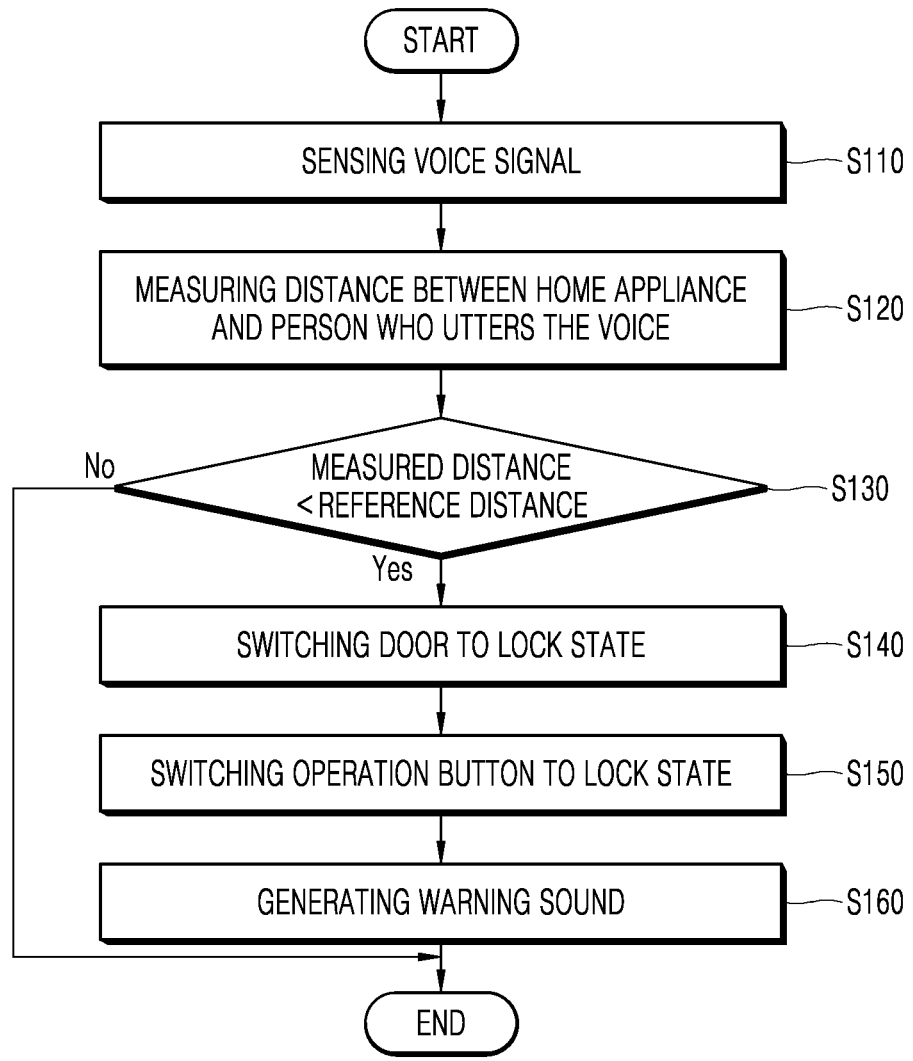
FIG. 6 is a flowchart of a method for preventing an accident according to an implementation of the present disclosure.

FIG. 6 is a flowchart of a method for preventing accidents according to an implementation of the present disclosure.

Referring to FIG. 6, according to an implementation of the present disclosure, in the method for preventing the accidents, an audio input 110 senses a voice signal of a person who utters voice (i.e., a speaker) (S110). The sensed voice signal is transmitted to a controller 140.

Then, the controller 140 measures a distance between the home appliance and the person who utters the voice (S120). At this time, the controller 140 may measure the distance between the home appliance and the person who utters the voice by comparing the signals related to the voice received at the plurality of MICs. Further, the controller 140 may measure the distance between the home appliance and the person who utters the voice by analyzing the data received from the sensor 130. However, this is merely an example, and the present disclosure is not limited to thereto.

Then, the controller 140 determines whether the measured distance is less than the reference distance (S130). At this time, the reference distance may be a preset distance (for example, 1 meter from the home appliance 100) to prevent the safety accidents. For reference, the reference distance may vary and implemented.

Then, if the measured distance is less than the reference distance, the controller 140 switches the door of the driver 150 to the lock state (S140). Specifically, the controller 140 may switch the first door 153A of the first washing unit 150A and the second door 153B of the second washing unit 150B to the lock state.

Then, the controller 140 switches an operation button of an interface 170 to the lock state (S150). Specifically, the controller 140 may switch the first interface 170A of the first washing unit 150A and a second interface 170B of the second washing unit 150B to the lock state.

Then, the controller 140 may enable an audio output 120 to generate warning sound (S160).

In addition, the controller 140 may enable a communicator 160 to transmit a notification message to a user terminal 300 registered in advances. At this time, the notification message may include information on 'the children or the pets approached the vicinity of the home appliance'.

For reference, in the method for preventing the accidents of the present disclosure, S150 and S160 described above may be omitted or selectively performed.

Accordingly, the present disclosure may fundamentally prevent the safety accidents from occurring due to the operation of the home appliance. That is, the present disclosure may enable switching the door to the lock state and switching the operation button to the lock state when the child or the pet approaches the home appliance. In other words, the method for preventing the accident of the present disclosure may enable minimizing the possibility of occurrence of the safety accidents by providing a double safety device.

Figure 7:
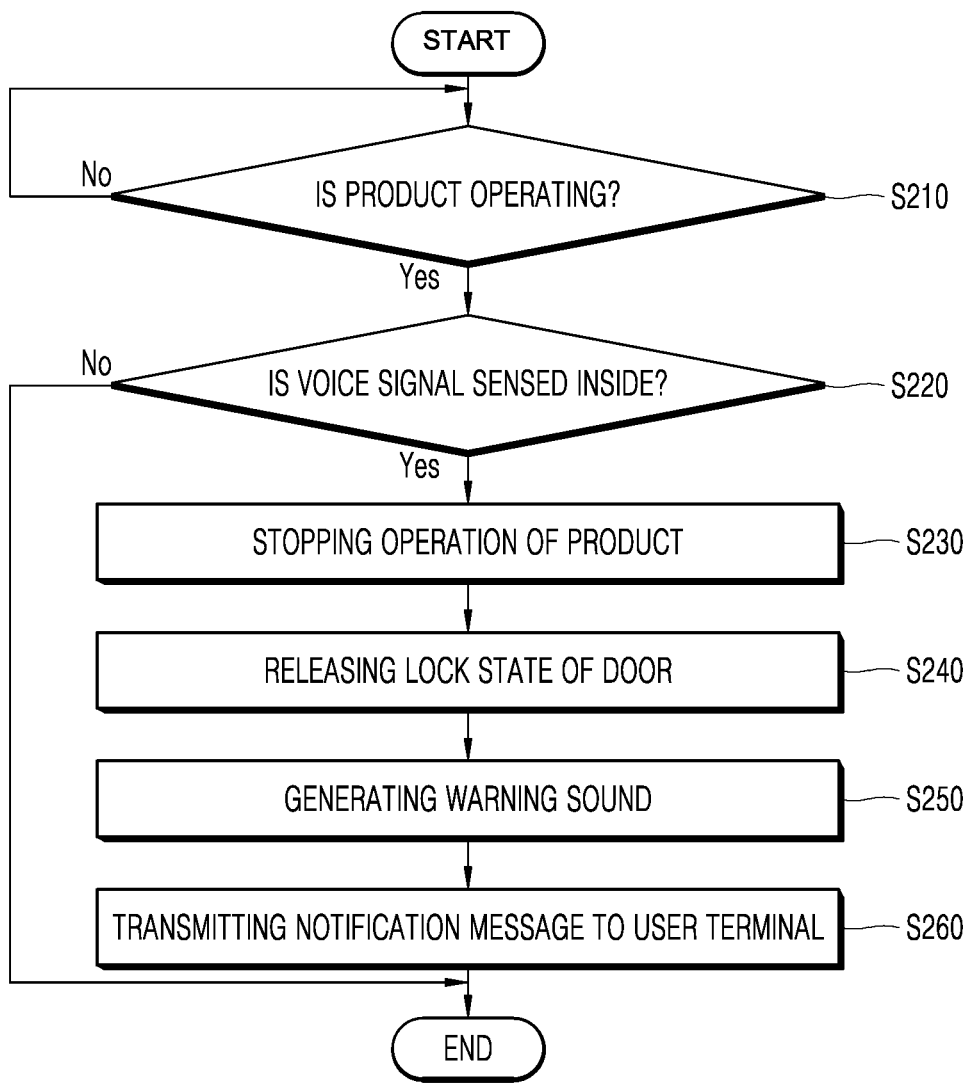
FIG. 7 is a flowchart of a method for preventing an accident according to another implementation of the present disclosure

FIG. 7 is a flowchart of a method for preventing an accident according to another implementation of the present disclosure.

Referring to FIG. 7, according to another implementation of the present disclosure, in the method for preventing an accident, a controller 140 determines whether a driver 150 is operating (S210).

When the driver 150 is in operation, the controller 140 determines whether a voice signal is sensed inside of the home appliance 100 by the audio input 110 (S220). The controller 140 may determine whether the children or the pet are locked in the driver 150 based on the above.

The controller 140 may determine whether the children or the pets enter the inside of the driver 150 based on the data received from a sensor 130. At this time, a PIR sensor, an image sensor, a thermal image sensor, an infrared sensor, or the like may be used as examples of the sensor 130.

If it is determined that the children or the pets are locked in the home appliance 100, the controller 140 immediately stops the operation of the home appliance 100 (S230).

Then, the controller 140 switches the door of the driver 150 to the open state (S240). Specifically, the controller 140 may switch a first door 153A of a first washing unit 150A and a second door 153B of a second washing unit 150B to the open state.

Then, the controller 140 may enable the audio output 120 to generate warning sound (S250). Accordingly, the controller 140 may inform the surrounding people that safety accident has occurred.

Then, the controller 140 may enable the communicator 160 to transmit a notification message to a user terminal 300 registered in advance (S260). At this time, the notification message may include information on 'children or pets are found inside of the home appliance'.

For reference, in the method for preventing the accident of the present disclosure, above-described S250 and S260 may be omitted or selectively performed.

Accordingly, the present disclosure may prevent the safety accidents that may occur when the children or the pets enter the inside of the home appliance 100. In addition, a guardian may be immediately notified of the dangerous situation by transmitting the notification message to the user terminal 300 registered in advance.

Figure 8:
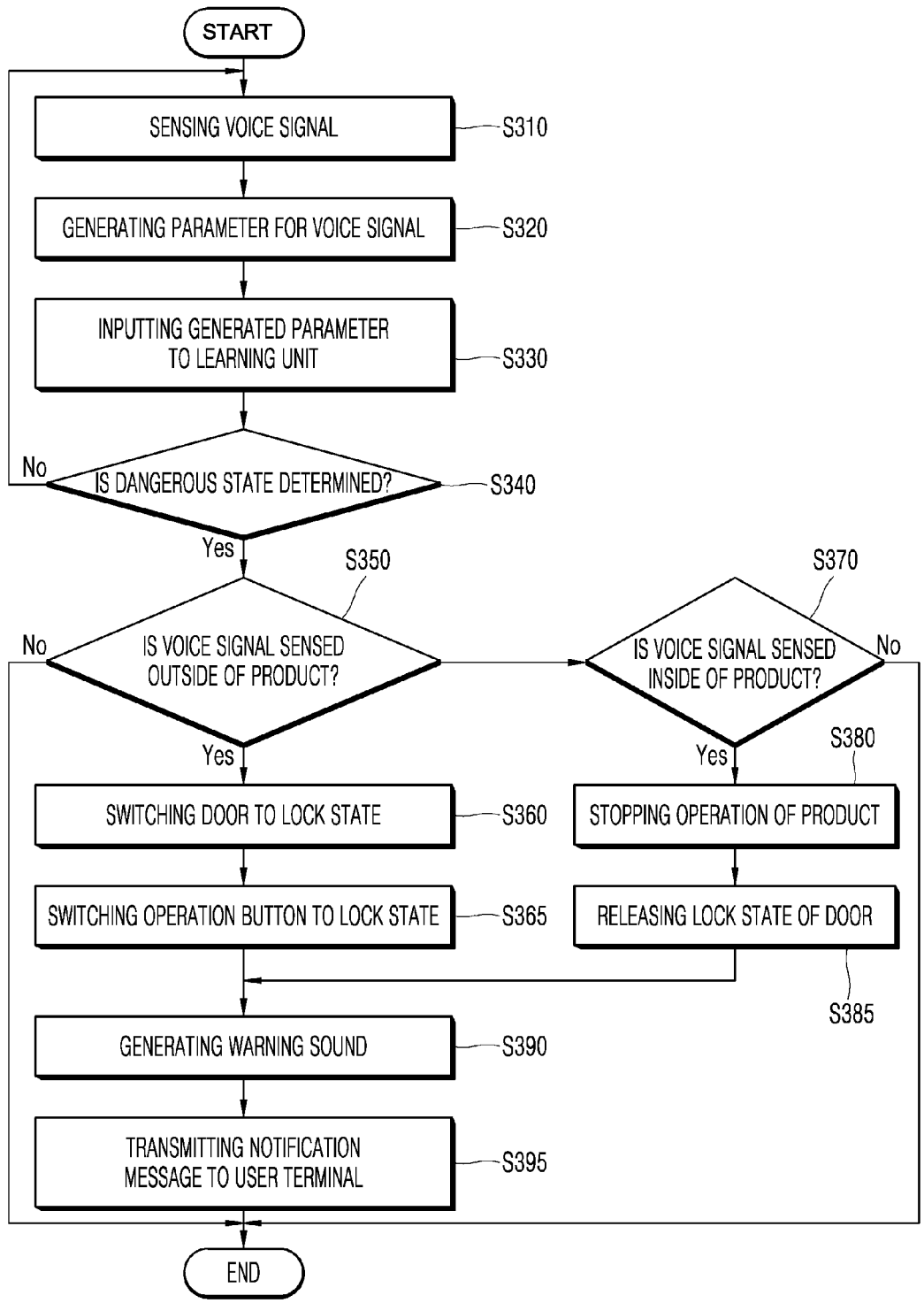
FIG. 8 is a flowchart of a method for preventing an accident according to another implementation of the present disclosure.

FIG. 8 is a flowchart of a method for preventing an accident according to another implementation of the present disclosure.

Referring to FIG. 8, according to another implementation of the present disclosure, in the method for preventing the accident, an audio input 110 senses a voice signal of a person who utters voice (i.e., a speaker) (S310). The sensed voice signal is transmitted to a controller 140.

Then, the controller 140 generates a parameter for the received voice signal (S320). The parameter may include at least one of a ratio of high-pitched tone of a voice signal, an average magnitude of the voice signal, and pattern information of the voice signal. However, this is merely an example, and the parameters may be variously modified and implemented.

In addition, the above-mentioned parameters may have factors that may be used to distinguish a variety of sounds, such as voice of children, playful sound of children, sound of pets, sound of screaming of children in emergency situations, and sound of pets in excited conditions.

Subsequently, the controller 140 inputs the generated parameters to the learning unit 190 (S330).

Subsequently, the learning unit 190 outputs state information indicating a state of the speaker based on the input parameters. The state information output from the learning unit 230 may include steady-state information and dangerous state information. At this time, each of steady-state information and dangerous state information may be expressed by probability.

Then, the controller 140 determines whether the current state of the speaker is in the dangerous state based on the state information output by the learning unit 190 (S340). At this time, the controller 140 may determine the current state of the speaker by comparing the probability of the occurrence of the steady-state and the probability of the occurrence of the dangerous state.

Specifically, when the probability of dangerous state information is greater than the probability of the steady-state information, the controller 140 may determine that the current state of the speaker is in the dangerous state. On the other hand, if the probability of dangerous state information is less than the probability of the steady-state information, the controller 140 may determine that the current state of the speaker is the steady state.

Then, if the current state of the speaker is in the dangerous state, the controller 140 determines whether the voice signal is sensed outside of the home appliance 100 (S350). For example, the controller 140 may calculate the distance between the home appliance and the person who utters the voice and the position of the person who utters the voice by comparing the signals related to the voice received at the plurality of MICs.

When the voice signal is sensed outside of the home appliance 100, the controller 140 switches the door of the driver 150 to the lock state (S360). Specifically, the controller 140 may switch the first door 153A of the first washing unit 150A and the second door 153B of the second washing unit 150B to the lock state.

Then, the controller 140 switches the operation button of the interface 170 to the lock state (S365). Specifically, the controller 140 may switch the first interface 170A of the first washing unit 150A and the second interface 170B of the second washing unit 150B to the lock state.

Then, the controller 140 enables the audio output 120 to generate the warning sound (S390). Accordingly, the controller 140 may notify the surrounding people that the current state of the speaker is in the dangerous state.

Then, the controller 140 may enable the communicator 160 to transmit a notification message to a user terminal 300 registered in advance (S395). At this time, the notification message may include information on 'children or pets have approached the vicinity of the home appliance, and the dangerous situation has occurred'.

Meanwhile, when the voice signal is sensed inside of the home appliance 100, the controller 140 immediately stops the operation of the home appliance 100 (S380).

Then, the controller 140 switches the door of the driver 150 to an open state (S385). Specifically, the controller 140 may switch the first door 153A of the first washing unit 150A and the second door 153B of the second washing unit 150B to the open state.

Then, the controller 140 may enable the audio output 120 to generate the warning sound (S390). Accordingly, the controller 140 may inform the surrounding people that the safety accident has occurred.

Then, the controller 140 may enable the communicator 160 to transmit the notification message to the user terminal 300 registered in advance (S395). At this time, the notification message may include information on 'the children or the pets are found inside of the home appliance and the dangerous situation has occurred'. However, such information is only an example and the present disclosure is not limited thereto.

For reference, in the method for preventing the accidents of the present disclosure, above described S390 and S395 may be omitted or selectively performed.

The above-described functions of the home appliances or cloud servers may be provided by a processor. For example, the processor senses the voice signal and calculates the position of the voice signal by the audio input of the home appliance.

When the generation position of the voice signal is outside of the home appliance, the processor compares the distance between the home appliance and the generation position of the voice signal and the reference distance, and if the distance between the home appliance and the generation position of the voice signal is less than the reference distance, the processor switches the door of the home appliance to the lock state.

The processor stops the operation of the home appliance and switches the door of the home appliance to the open state when the generation position of the voice signal is inside of the home appliance and the home appliance is in operation.

Accordingly, the present disclosure may enable preventing the safety accidents that may occur when the children or the pets enter the inside of the home appliance 100. In addition, a guardian may be immediately notified of the dangerous situation by transmitting the notification message to the user terminal 300 registered in advance.

In addition, risk of occurrence of the accidents may be further reduced by determining the dangerous situation by machine learning based on the sensed sound, thereby improving the reliability of the user with respect to the product and improving a brand value of the product.

While the present disclosure has been mainly described with reference to the implementation of the present disclosure hereinabove, various modifications and changes may be made at the level of those skilled in the art. Therefore, unless such modifications and changes do not deviate the scope of the present disclosure, it will understand that they are included in the scope of the present disclosure.

What is claimed is:

1. A method for preventing an accident performed by a home appliance and a cloud server that communicates with the home appliance, comprising:
   sensing, by an audio input of the home appliance, a voice signal;
   calculating a generation position of the voice signal;

comparing a distance between the home appliance and the generation position of the voice signal with a reference distance when the generation position of the voice signal is outside of the home appliance; and switching a door of the home appliance to a lock state when the distance between the home appliance and the generation position of the voice signal is less than the reference distance;

wherein calculating the generation position of the voice signal comprises:

generating a parameter for the sensed voice signal;

inputting the parameter as a learning factor to a learning unit of the home appliance and receiving state information indicating a state of a speaker who has output the voice signal as an output; and calculating the generation position of the voice signal when the state of the speaker is determined to be in a dangerous state based on the state information.

2. The method for preventing the accident of claim 1, further comprising switching an operation button of the home appliance to the lock state when the distance between the home appliance and the generation position of the voice signal is less than the reference distance.

3. The method for preventing the accident of claim 1, further comprising generating a warning sound, by an audio output of the home appliance, when the distance between the home appliance and the generation position of the voice signal is less than the reference distance.

4. The method for preventing the accident of claim 1, further comprising transmitting a notification message to a user terminal registered in advance when the distance between the home appliance and the generation position of the voice signal is less than the reference distance.

5. The method for preventing the accident of claim 1,
wherein the state information comprises steady-state information and dangerous state information expressed by a probability, and
wherein the dangerous state indicates a case in which the probability of the dangerous state information is greater than the probability of the steady-state information.

6. The method for preventing the accident of claim 1, wherein the parameter comprises at least one of a ratio of high-pitched tone of the voice signal, an average magnitude of the voice signal, and pattern information of the voice signal.

7. The method for preventing the accident of claim 1,
wherein the learning unit comprises:
an input layer that has the parameter as an input node,
an output layer that has the state information as an output node, and
at least one hidden layer between the input layer and the output layer,
wherein weights of nodes and edges between the input node and the output node are updated by a learning process of the learning unit.

8. A method for preventing an accident performed by a home appliance and a cloud server that communicates with the home appliance, comprising:
sensing, by an audio input of the home appliance, a voice signal;
determining a generation position of the voice signal; and
stopping an operation of the home appliance and switching a door of the home appliance to an open state when the generation position is the inside of the home appliance and the home appliance is in operation;
wherein determining the generation position of the voice signal comprises:

generating a parameter for the sensed voice signal;
inputting the parameter to a learning unit of the home appliance as a learning factor and receiving state information indicating a state of a speaker who has output the voice signal as an output; and
determining whether the generation position of the voice signal is inside of the home appliance when the state of the speaker is determined to be in a dangerous state based on the state information.

9. The method for preventing the accident of claim 8, further comprising transmitting a notification message to a user terminal registered in advance when the generation position is inside of the home appliance and the home appliance is in operation.

10. The method for preventing the accident of claim 8, further comprising generating, by an audio output of the home appliance, warning sound when the generation position of the voice signal is inside of the home appliance and the home appliance is in operation.

11. The method for preventing the accident of claim 8,
wherein the state information comprises steady-state information and dangerous state information expressed by a probability, and
wherein the dangerous state indicates a case in which the probability of the dangerous state information is greater than the probability of the steady-state information.

12. The method for preventing the accident of claim 8, wherein the parameter comprises at least one of ratio of a high-pitched tone of the voice signal, an average magnitude of the voice signal, and pattern information of the voice signal.

13. The method for preventing the accident of claim 8,
wherein the learning unit comprises:
an input layer that has the parameter as an input node,
an output layer that has the state information as an output node, and
at least one hidden layer between the input layer and the output layer, and
wherein weights of a node and an edge between the input node and the output node are updated by a learning process of the learning unit.

14. A processor for configuring a home appliance or a cloud server that communicates with the home appliance,
wherein the processor senses a voice signal and calculates a generation position of the voice signal by an audio input of the home appliance,
wherein, the processor, when the generation position is outside of the home appliance, is configured to compare the distance between the home appliance and the generation position with a reference distance, and if the distance between the home appliance and the generation position is less than the reference distance, the processor is configured to switch a door of the home appliance to a lock state, and
wherein the processor is configured to stop an operation of the home appliance and switch the door of the home appliance to an open state when the generation position of the voice signal is the inside of the home appliance and the home appliance is in operation;
wherein the processor is configured to generate a parameter for the sensed voice signal,
wherein the processor is configured to input the parameter to a learning unit of the processor as a learning factor and receive state information indicating a state of a speaker who has output the voice signal as an output thereof, and wherein the processor is configured to determine whether the generation position of the voice signal is inside of the home appliance when the state of the speaker is determined to be in a dangerous state based on the state information.

15. The processor of performing control to prevent an accident of claim 14, wherein the processor is configured to generate, by the audio output of the home appliance, a warning sound.

16. The processor of performing control to prevent the accident of claim 14, wherein the processor is configured to transmit a notification message to a user terminal registered in advance.

17. The processor of performing control to prevent an accident of claim 14,
wherein the state information comprises steady-state information and dangerous state information expressed by a probability, and
wherein the dangerous state indicates a case in which the probability of the dangerous state information is greater than the probability of the steady-state information.

* * * * *